United States Patent [19]

Bealkowski et al.

[11] Patent Number: 5,752,066

[45] Date of Patent: May 12, 1998

[54] DATA PROCESSING SYSTEM UTILIZING PROGAMMABLE MICROPROGRAM MEMORY CONTROLLER

[75] Inventors: Richard Bealkowski, Delray Beach; Brenda M. Ozaki, Deerfield Beach, both of Fla.

[73] Assignee: International Business Machines Corporation, Armonk, N.Y.

[21] Appl. No.: 695,946

[22] Filed: Aug. 13, 1996

Related U.S. Application Data

[63] Continuation of Ser. No. 817,239, Jan. 6, 1992, abandoned.

[51] Int. Cl.$^6$ .................................................. G06F 9/00
[52] U.S. Cl. ................ 395/800.01; 395/427; 395/492; 395/497.01; 364/DIG. 1; 364/238.4
[58] Field of Search ................. 395/800.01, 497.01, 395/431, 427, 492, 397.02–497.09

[56] References Cited

U.S. PATENT DOCUMENTS

| | | | |
|---|---|---|---|
| 4,446,517 | 5/1984 | Katsura et al. | 395/375 |
| 4,985,871 | 1/1991 | Catlin | 365/230.06 |
| 4,987,532 | 1/1991 | Noguchi | 395/375 |
| 5,005,157 | 4/1991 | Catlin | 365/193 |
| 5,101,490 | 3/1992 | Getson, Jr. et al. | 395/425 |
| 5,161,218 | 11/1992 | Catlin | 395/425 |
| 5,187,792 | 2/1993 | Dayan et al. | 395/725 |
| 5,226,134 | 7/1993 | Alderequia et al. | 395/425 |
| 5,230,052 | 7/1993 | Dayan et al. | 395/700 |
| 5,283,877 | 2/1994 | Gastinel et al. | 395/425 |
| 5,287,480 | 2/1994 | Wahr | 395/425 |
| 5,522,064 | 5/1996 | Alderequia et al. | 395/550 |

OTHER PUBLICATIONS

80386–33/40 CWB User's Manual PC User's Manual, 1990 pp. 1–44.

Primary Examiner—Mehmet B. Geckil
Attorney, Agent, or Firm—Jeffrey S. LaBaw; Andrew J. Dillon

[57] ABSTRACT

A data processing system is disclosed utilizing a microprogram memory controller wherein the memory controller may be altered and/or upgraded to accommodate variations in memory systems while maintaining a compatible system-level interface. The memory controller includes a microprogram engine and a resident microprogram stored within nonvolatile memory coupled to the microprogram engine wherein the microprogram engine may utilize the resident microprogram to manage, configure and determine operational modes for a memory subsystem. A variable microprogram may also be loaded within Random Access Memory associated with the microprogram engine and utilized to extend or enhance the operation of the memory controller. The memory controller also preferably utilizes a control interface for providing an interface between the memory controller and the processor, which may be utilized to control the loading of the variable microprogram into the memory controller from an external source.

12 Claims, 2 Drawing Sheets

DATA PROCESSING SYSTEM UTILIZING PROGAMMABLE MICROPROGRAM MEMORY CONTROLLER

This is a continuation of application Ser. No. 07/817,239, filed Jan. 6, 1992 now abandoned.

BACKGROUND OF THE INVENTION

1. Technical Field

The present invention relates in general to improved data processing systems and in particular to an improved memory controller for utilization in a data processing system. Still more particularly, the present invention relates to a microprogram memory controller for utilization in a data processing system wherein the microprogram memory controller may be utilized to provide a system-level interface to a memory subsystem which may be altered to accommodate variations in the memory subsystem.

2. Description of the Related Art

In many state-of-the-art personal computer systems a number of semiconductor chips are required in order to assist the microprocessor in the various functions necessary to operate the computer. For example, a memory controller chip is often utilized to control Dynamic Random Access Memory (DRAM). Such memory controllers are typically utilized to identify the number and type of memory modules within a memory subsystem. Thereafter, in response to the application of electrical power to the computer system, selected firmware, such as Power-On Self-Test (POST) is then utilized to interrogate the memory controller and thereafter load a substantial amount of information into internal registers within the memory controller to be utilized by the memory controller to decode addresses and determine which of a number of banks of memory to select.

While such memory controllers operate in a highly efficient manner, the operation and performance of Random Access Memory within a personal computer system is a significant factor in the overall performance of that system. Thus, enhancements to Random Access Memory technology, in terms of memory density, speed, and cost are often implemented for each new iteration of a computer system. As a result, the interface within a computer system to the memory controller must evolve with each new design and that interface is typically not compatible with previous designs. A substantial amount of system-level program code is therefore required to program each new memory controller in response to an enhancement to the memory subsystem within a personal computer system.

It should therefore be apparent that a unified, system-level interface to a memory subsystem within a personal computer system would be highly desirable. Specifically, an architected interface which appears consistent to the system software across multiple implementations and multiple memory subsystems, if implemented, would free the system-level programmer from the tedious and burdensome details of managing the memory subsystem. Thus, a need is seen to exist for a memory controller which may be selectively altered to accommodate variations in the memory subsystem while providing a consistent system-level interface between the memory subsystem and the processor within a personal computer system.

SUMMARY OF THE INVENTION

It is therefore one object of the present invention to provide an improved data processing system.

It is another object of the present invention to provide an improved memory controller for utilization in a data processing system.

It is yet another object of the present invention to provide a microprogram memory controller for utilization in a data processing system wherein the microprogram memory controller may be utilized to provide a system-level interface to a memory subsystem which may be altered to accommodate variations in the memory subsystem.

The foregoing objects are achieved as is now described. A data processing system is provided utilizing a microprogram memory controller wherein the memory controller may be altered and/or upgraded to accommodate variations in memory systems while maintaining a compatible system-level interface. The memory controller includes a microprogram engine and a resident microprogram stored within nonvolatile memory coupled to the microprogram engine wherein the microprogram engine may utilize the resident microprogram to manage, configure and determine operational modes for a memory subsystem. A variable microprogram may also be loaded within Random Access Memory associated with the microprogram engine and utilized to extend or enhance the operation of the memory controller. The memory controller also preferably utilizes a control interface for providing an interface between the memory controller and the processor, which may be utilized to control the loading of the variable microprogram into the memory controller from an external source.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
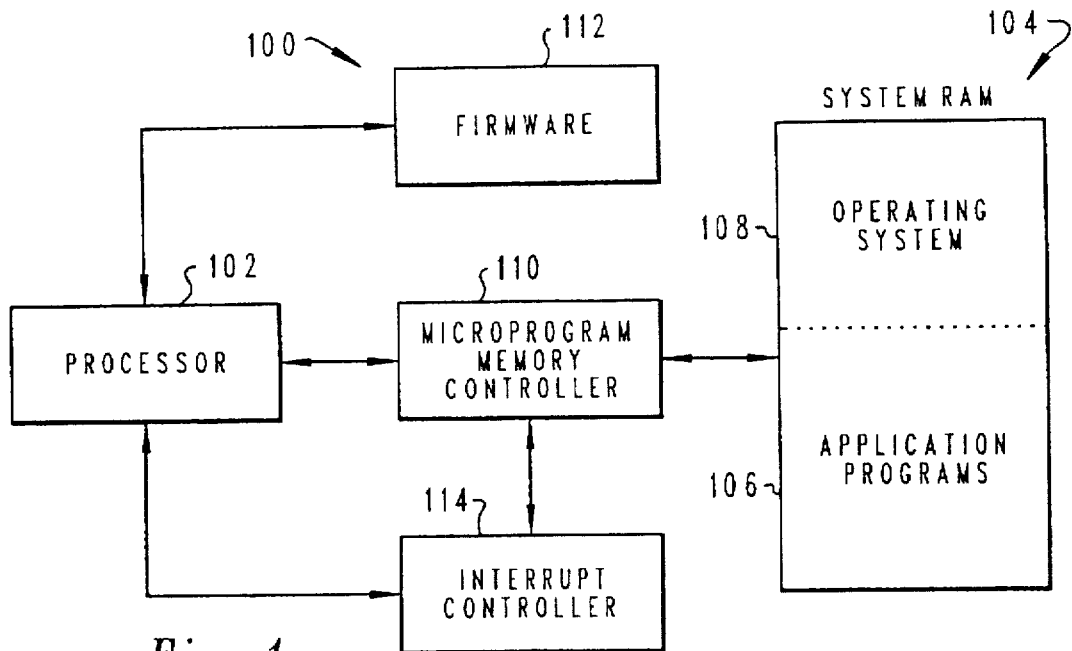
FIG. 1 is a high level block diagram of a data processing system which may be utilized to implement the method and system of the present invention.

With reference now to the figures and in particular with reference to FIG. 1, there is depicted a high level block diagram of a data processing system 100 which may be utilized to implement the method and system of the present invention. As illustrated, data processing system 100 includes a processor 102 and a memory subsystem 104. As depicted, memory subsystem 104 is implemented utilizing Random Access Memory (RAM) and includes memory area 106 which is utilized to store application programs and data and memory area 108 which serves to store the operating system software utilized to implement data processing system 100.

As depicted within FIG. 1, a microprogram memory controller 110 is utilized to assist processor 102 in accessing and utilizing memory subsystem 104. In a preferred embodiment of the present invention, microprogram memory controller 110 is implemented utilizing a microprogram engine and resident microprogram, in a manner which will be explained in greater detail below. Also depicted within FIG. 1 is firmware 112. Those skilled in the art will appreciate that certain functions within data processing system 100 are typically stored within nonvolatile memory, such as the Basic Input/Output System (BIOS) which is microcode which is utilized to control the basic hardware operations within data processing system 100, such as interactions between data processing system 100 and diskette drives, fixed disk drives and a keyboard (not shown). Also typically stored within nonvolatile memory as firmware 112 is the Power-On Self-Test (POST) which is generally a series of diagnostic tests which are run automatically by data processing system 100 when power is applied.

Finally, interrupt controller 114 is depicted within FIG. 1. Those skilled in the art will appreciate that an interrupt controller is utilized to supervise the suspension of a process, such as the execution of a computer program, which may be caused by an external event and to control the manner in which that process may be resumed.

Figure 2:
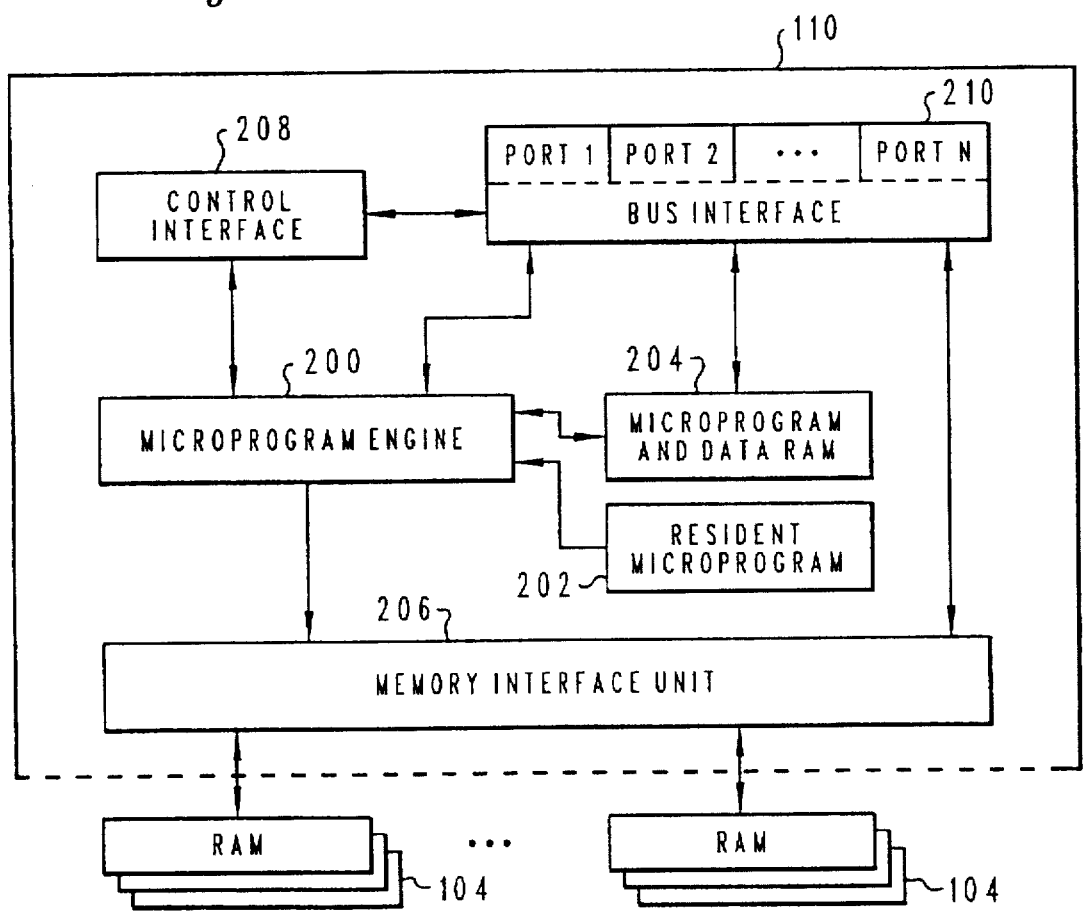
FIG. 2 is a high level block diagram of a microprogram memory controller implemented in accordance with the method and system of the present invention.

Referring now to FIG. 2, there is depicted a high level block diagram of a microprogram memory controller implemented in accordance with the method and system of the present invention. Microprogram memory controller 110 is preferably utilized to provide a defined system-level interface between processor 102 and memory subsystem 104 (see FIG. 1). Central to microprogram memory controller 110 is microprogram engine 200. Microprogram engine 200 may obtain instruction code from resident microprogram 202, which is stored within nonvolatile memory. Various technologies are available for storing resident microprogram 202 within nonvolatile storage including either Read Only Memory (ROM) or so-called "Flash" memory, that is, in-place reprogrammable nonvolatile storage which may be reprogrammed electrically in a manner well known to those skilled in the art.

Secondly, a variable microprogram may be stored within Microprogram and Data Random Access Memory (RAM) 204. By permitting a variable microprogram to be loaded within Random Access Memory (RAM) as depicted at reference numeral 204, those skilled in the art will appreciate that microprogram memory controller 110 may be initialized with instructions for microprogram engine 200 from an external source, such as the system-level processor, processor 102. By permitting a variable microprogram to be loaded within Microprogram and Data Random Access Memory (RAM) 204, microprogram memory controller 110 has the inherent ability to upgrade its operation after a fixed design to accommodate changes such as new memory technologies or changes and enhancements to the system-level interface.

Management of microprogram memory controller 110 occurs through control interface 208. Control interface 208 permits processor 102 to communicate with microprogram memory controller 110 and also permits microprogram memory controller 110 to communicate with external entities for purposes such as status and error reporting. Control interface 208 may be implemented utilizing programmed input/output. Those skilled in the art will appreciate that the programmed input/output interface is advantageous since this interface does not require any system Random Access Memory (RAM) to be initialized, as compared to mechanisms which require a control block to be built into system Random Access Memory (RAM), which may only be utilized after system Random Access Memory (RAM) has been initialized and is operational.

Still referring to FIG. 2, those skilled in the art will appreciate that in implementations in which a resident microprogram is present within nonvolatile storage, as indicated at reference numeral 202, microprogram engine 200 may be utilized to load instructions and data from an external source. However, when no resident microprogram is utilized, an external source must control the loading of instructions and data into microprogram engine 200. This is preferably done utilizing control interface 208, which may be utilized to allow an external source the ability to load a variable microprogram into Microprogram and Data Random Access Memory (RAM) 204 without the assistance of microprogram engine 200. This may be accomplished utilizing bus interface 210 as the data path from the external source of the variable microprogram to Microprogram and Data Random Access Memory (RAM) 204, in a manner well known to those skilled in the art. Bus interface 210 may preferably be configured with one or more ports which allow for separate connections to the memory subsystem, in the manner depicted within FIG. 2. This multiple port design permits simultaneous, independent activities to be accommodated by memory subsystem 104.

As depicted, microprogram engine 200 is utilized to manage memory interface unit 206. Memory interface unit 206 is preferably configurable by microprogram engine 200 and thereafter an external source may access memory subsystem 104 utilizing bus interface 210 and memory interface unit 206. It should be noted that instructions from microprogram engine 200 operate in parallel with memory accesses from bus interface 210, rather than between such accesses and, as a result, the efficiency of microprogram memory controller 110 is greatly enhanced.

Upon reference to the foregoing those skilled in the art will appreciate that microprogram memory controller 110 of the present invention places a level of intelligence much closer to memory subsystem 104 than has been available utilizing previously known memory controllers. By locating microprogram memory controller 110 and its associated microprogram and microprogram engine 200 closer, both physically and logically, to memory subsystem 104, better control of memory subsystem 104 is possible, as well as isolation in the event of a fault is available.

By incorporating a higher level of intelligence within microprogram memory controller 110, initial memory configuration may be completed by microprogram memory controller 110 upon receiving a SETUP command issued by data processing system 100 software. For faster initialization, microprogram memory controller 110 may utilize resident microprogram 202 to begin SETUP immediately after a reset. Microprogram memory controller 110 may also be utilized to incorporate size and presence information provided by a Single In-Line Memory Modules to automatically configure memory subsystem 104. An internal control program may be utilized to assign address ranges to Single In-Line Memory Modules and thereafter determine operational modes, such as interleaved or non-interleaved. Once such a configuration has been completed, data such as "memory size" and "initialization complete" could be made available to system-level software through control interface 208.

Additional activities which may be performed by microprogram memory controller 110 once implemented in the manner set forth within the present application include the managing of refresh, performance monitoring, and diagnostic monitoring. Microprogram memory controller 110 may independently generate refresh and scrub cycles, and may contain an enhanced refresh algorithm which monitors addresses accessed or that could refresh during idle bus cycles. Error detection and correction may also be managed by microprogram memory controller 110; however, uncorrectable errors will still need to be reported to the system to permit the system to take whatever recovery actions are deemed appropriate.

Figure 3:
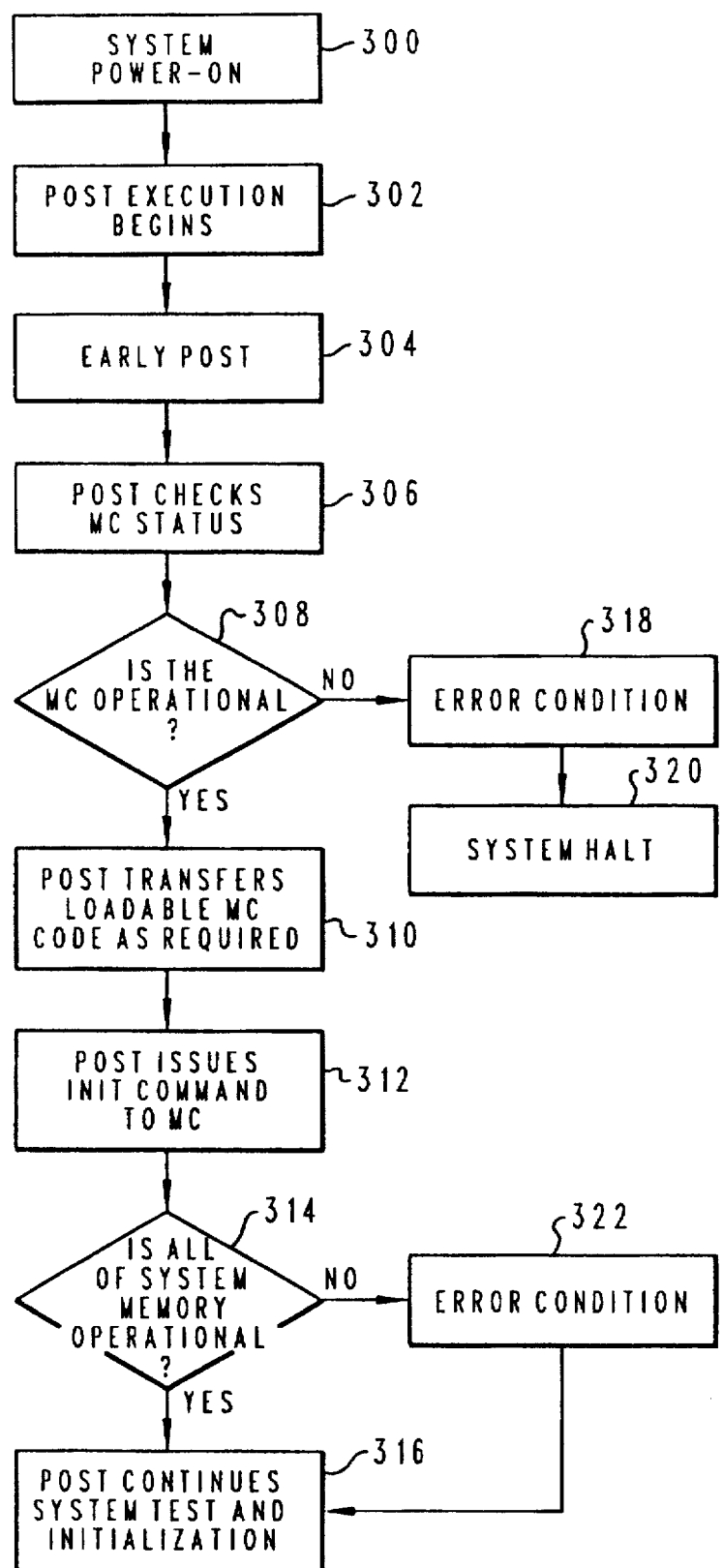
FIG. 3 is a high level logic flowchart illustrating the initiation of a data processing system utilizing the method and system of the present invention.

With reference now to FIG. 3, there is depicted a high level logic flowchart illustrating the initiation of a data processing system utilizing the method and system of the present invention. As illustrated, the process begins at block 300 which depicts the application of electrical power to data processing system 100. Next, the process passes to block 302 which illustrates the initiation of the Power On Self Test (POST) process.

Next, the process passes to block 304 which illustrates the accomplishment of early POST processing. Thereafter, as depicted at block 306, the POST process checks the microprogram memory controller status. Thereafter, block 308 illustrates a determination of whether or not the microprogram memory controller is operational and if not, the process passes to block 318, which illustrates the returning of an error condition. The process thereafter passes to block 320, which depicts the halting of data processing system 100.

Referring again to block 308, in the event the microprogram memory controller is operational, the process passes to block 310. Block 310 illustrates the transferring by the POST system of variable microprogram memory controller code, as required. Those skilled in the art will appreciate, upon reference to the foregoing, that the microprogram memory controller of the present invention may be implemented utilizing a resident microprogram fixed within nonvolatile storage, alternatively, may be implemented utilizing a variable microprogram which may be downloaded each time the system is initialized into Microprogram and Data Random Access Memory 204. Additionally, a resident microprogram may be utilized in conjunction with a variable microprogram for enhancements, extensions or repairs.

Next, the process passes to block 312 which illustrates the issuing of an initialization command to the microprogram memory controller by the POST system. Of course, microprogram engine 200 then performs initialization based upon instructions contained within either resident microprogram 202 or within the variable microprogram stored within Microprogram and Data Random Access Memory (RAM) 204.

The process then passes to block 314 which illustrates a determination of whether or not all of memory subsystem 104 is operational. If not, the process passes to block 322 which depicts the returning of an error condition. However, in the event all of the system memory is operational, as determined at block 314, the process passes to block 316. Block 316 illustrates the continuing by the POST system of system test and initialization procedures.

Upon reference to the foregoing those skilled in the art will appreciate that the Applicants, by implementing a microprogram memory controller having a higher level of intelligence than previously known memory controllers have provided a system-level interface to a data processing system which remains relatively constant and which may accommodate variations within a memory subsystem. By transferring the higher intelligence aspects of memory control from the POST system down to microprogram memory controller 110, and by permitting microprogram memory controller 110 to be enhanced, extended or altered utilizing a variable microprogram which is downloaded to the microprogram engine within microprogram memory controller 110, the microprogram memory controller of the present invention permits a higher degree of flexibility and efficiency than all previously known memory controllers.

While the invention has been particularly shown and described with reference to a preferred embodiment, it will be understood by those skilled in the art that various changes in form and detail may be made therein without departing from the spirit and scope of the invention.

We claim:

1. An improved data processing system, said data processing system comprising:

a random access memory subsystem for storing a plurality of programs and data;

a firmware memory subsystem for storing a Basic Input/Output System for controlling hardware operations within said data processing system including basic memory functions;

a processor coupled to said random access memory subsystem and said firmware memory subsystem for processing said plurality of programs; and a memory controller coupled to said processor for providing a system-level interface between said processor and said random access memory subsystem for controlling enhanced memory functions, said memory controller comprising:

a microprogram engine; and nonvolatile memory coupled to said microprogram engine having a resident microprogram stored therein wherein said microprogram engine may utilize said resident microprogram to manage said random access memory subsystem.

2. The improved data processing system according to claim 1, further including random access memory coupled to said microprogram engine having a variable microprogram stored therein wherein variations within said random access memory subsystem is accommodated by said memory controller utilizing said variable microprogram.

3. The improved data processing system according to claim 2, further including a control interface disposed between said memory controller and said processor for controlling loading of said variable microprogram into said memory controller from an external source.

4. The improved data processing system according to claim 3, further including a memory interface unit disposed between said microprogram engine and said random access memory subsystem.

5. The improved data processing system according to claim 4, wherein said memory interface unit is configurable by said memory controller.

6. The improved data processing system according to claim 1, wherein said nonvolatile memory comprises in-place reprogrammable non-volatile memory.

7. The improved data processing system according to claim 1, wherein said random access memory subsystem includes a plurality of Single In-Line Memory Modules and wherein size and presence information provided by said Single In-Line Memory Modules is utilized by said memory controller to configure said random access memory subsystem utilizing said resident microprogram.

8. An improved data processing system, said data processing system comprising:

a random access memory subsystem for storing a plurality of programs and data;

a firmware memory subsystem for storing a Basic Input/Output System for controlling hardware operations within said data processing system including basic memory functions;

a processor coupled to said random access memory subsystem and said firmware memory subsystem for processing said plurality of programs; and a memory controller coupled to said processor for providing a system level interface between said processor and said random access memory subsystem for controlling enhanced memory functions, said memory controller comprising:

a microprogram engine; and random access memory coupled to said microprogram engine for receiving variable microprogram wherein said microprogram engine may utilize said variable microprogram to manage said random access memory subsystem.

9. The improved data processing system according to claim 8, further including a control interface disposed between said memory controller and said processor for controlling loading of said variable microprogram into said memory controller from an external source.

10. The improved data processing system according to claim 8, further including a memory interface unit disposed between said microprogram engine and said random access memory subsystem.

11. The improved data processing system according to claim 10, wherein said memory interface unit is configurable by said memory controller.

12. The improved data processing system according to claim 8, wherein said random access memory subsystem includes a plurality of Single In-Line Memory Modules and wherein size and presence information provided by said Single In-Line Memory Modules is utilized by said memory controller to configure said random access memory subsystem utilizing said variable microprogram.

* * * * *